Jan. 22, 1957　　R. W. HAUTZENROEDER　　2,778,655

STEERING MECHANISM FOR TRACTORS

Filed Nov. 22, 1954　　　　　　　　　　　　　　2 Sheets-Sheet 1

INVENTOR.
RICHARD W. HAUTZENROEDER
BY
*Carlsen, Pitzner, Hubbard & Wolfe*
ATTORNEYS.

Jan. 22, 1957  R. W. HAUTZENROEDER  2,778,655
STEERING MECHANISM FOR TRACTORS
Filed Nov. 22, 1954  2 Sheets-Sheet 2

INVENTOR.
RICHARD W. HAUTZENROEDER
BY
*Carlson, Pitzner, Hubbard & Wolfe*
ATTORNEYS.

United States Patent Office 2,778,655
Patented Jan. 22, 1957

2,778,655

STEERING MECHANISM FOR TRACTORS

Richard W. Hautzenroeder, Detroit, Mich., assignor to Massey-Harris-Ferguson Inc., Racine, Wis., a corporation of Maryland Application November 22, 1954, Serial No. 470,488

2 Claims. (Cl. 280—93)

The invention relates to steering mechanism for wheeled tractors and particularly tractors of the type commonly known as agricultural tractors.

The general object of the invention is to provide simple, durable steering mechanism which is economical and practical to manufacture and which eliminates a number of objectionable characteristics inherent in the steering mechanisms heretofore used or proposed for tractor use.

One of the objectionable characteristics of prior steering mechanisms arises from the difficulty of compensating for the different distances of the inside and outside wheels from the point about which the tractor turns when it deviates from a straight-ahead path. It is one object of the present invention to provide a steering mechanism embodying simple yet effective means for effecting such compensation without the use of complicated linkages.

In agricultural tractors provision is customarily made for adjusting the tread width, that is, the lateral spacing between the wheels, to adapt them for row crop work. Such adjustment is usually effected by utilizing an extensible front axle, for example, one with end sections or wheel supports that can be extended or retracted laterally of the tractor. Those sections, of course, are stabilized by the usual radius rods.

Such tread adjustments introduce complications into the geometry of the steering mechanism and unless connections between the take-off arms of the steering gear box and the drag links which extend to the wheels are accurately alined vertically when in the straight ahead position, there will be objectionable variation in wheel alinement, particularly the "toe-in" of the wheels for different tread width adjustments. Heretofore it has been found possible to obtain such alinement only by utilizing steering arms of equal length mounted on coaxially alined shafts. However, the gear requirements for connecting such alined shafts are complicated and expensive and the resultant unit is bulky.

In general, the more compact and economical offset shaft type of steering unit with steering arms of unequal length has been considered more practical and desirable for tractors. However, attempts to adapt such units for operation in conjunction with adjustable tread steering wheels has been only partially successful. At best, variation in wheel alinement has been reduced to a point where reasonably satisfactory operation is attained at the relatively low speeds used in field operations. There is, however, sufficient misalinement in some adjusted positions of the wheels to interfere with steering when the tractor is driven at highway speeds and enough to seriously accelerate tire wear.

Another object of the invention is to provide a steering unit of the offset shaft type which introduces no variations whatever in wheel alinement for any tread width adjustment between maximum and minimum limits.

Other objects and advantages of the invention will become apparent from the following detailed description of the preferred embodiment illustrated in the accompanying drawings, in which Figure 1 is a sectional view taken substantially centrally and longitudinally in a vertical plane through the gear box of a steering mechanism embodying the features of the invention.

Fig. 4 is a diagrammatic view showing the range of movement of the steering arms.

Figure 2:
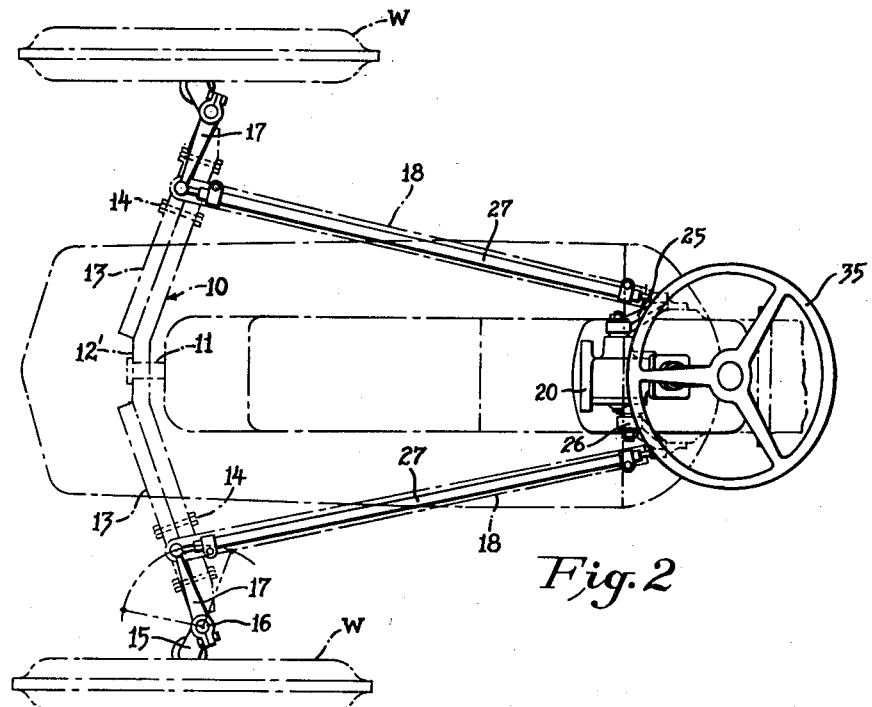
Fig. 2 is a top view of the steering mechanism showing its application to a tractor.
Figure 3:
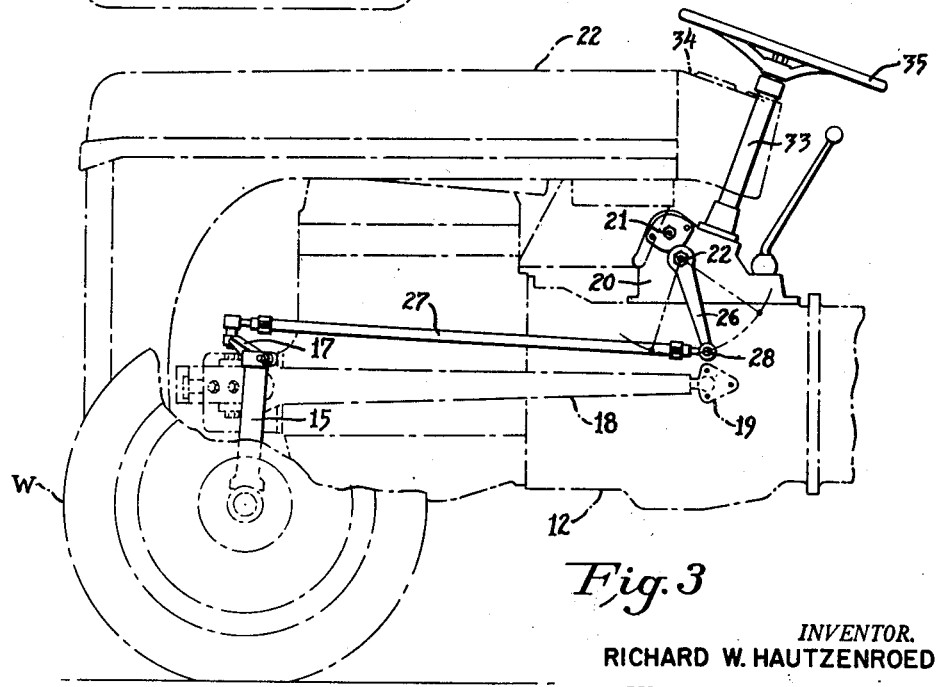
Fig. 3 is a side elevational view of the structure shown in Fig. 2.

While the invention is susceptible of various modifications and alternative constructions, a preferred embodiment has been shown in the drawings and will be described in detail herein. It is to be understood, however, that there is no intention to limit the invention to the specific form disclosed but, on the contrary, the intention is to cover all modifications, adaptations and alternative constructions falling within the spirit and scope of the invention as expressed in the appended claims.

For purposes of illustration, the steering mechanism constituting the present invention has been shown as incorporated in a tractor equipped with an adjustable front wheel supporting structure of the general type disclosed in the Ferguson Patent No. 2,247,725, issued July 1, 1941. As will be seen by reference to Fig. 2 of the drawings, the wheel supporting structure comprises a front axle 10 pivotally mounted as at 11 at the front end of the elongated body 12 of the tractor. The axle 10 in the form shown comprises a central section 12' with adjustable end sections or wheel supports 13 projecting at opposite ends. The supports 13 are adapted to be rigidly clamped to this central section of the axle in various positions of lateral adjustment as by bolts 14. At their outer ends, the supports 13 terminate in bushings 15 journaling king pins 16 formed with the usual spindles for rotatably supporting the front wheels W of the tractor. Rocking of the king pins to change the position of the wheels is effected through the medium of knuckle arms 17 clamped or otherwise rigidly secured to the upper ends of the king pins.

In the wheel supporting mechanism shown, the outer ends of the wheel supports 13 are stabilized by radius rods 18 which are pivotally connected to the supports at their forward ends and which are connected to the tractor body at their rear ends as by ball and socket connectors 19. The axle 10 is shaped so that in the lateral adjustment of the support members, the radius rods will pivot about their connectors 19.

The steering mechanism constituting the present invention comprises a gear box 20 suitably mounted on the upper portion of the tractor body and rotatably supporting a pair of take-off shafts 21 and 22 having their respective opposite ends projecting at the sides of the gear box. Within the gear box the shafts are drivingly interconnected by intermeshing gear teeth 23 and 24 formed integrally with the shafts, the arrangement being such that the shafts are constrained to rock together but in opposite directions.

On their projecting ends, the shafts 21 and 22 carry rigid crank or steering arms 25 and 26 which have their outer ends connected by drag links 27 with the knuckle arms 17 of the respective wheel spindles. Preferably, the connection between the drag links, steering arms and the knuckle arms are made through ball and socket connector 28 providing universal joints between the parts.

Rocking of the take off shafts is effected by means of the usual steering shaft 30 rotatably supported at its lower end in the gear box by spaced antifriction bearings 31 and 32 and extending upwardly therefrom at an angle providing for convenient manipulation by the tractor driver. As herein shown, the steering shaft extends through an upright column 33 supported between the gear box and a suitable stationary part of the tractor such as the cowl or instrument panel 34. At its upper end the steering shaft is fitted with the usual steering wheel 35.

While any suitable means may be utilized for operatively connecting the steering shaft 30 with the take-off shafts, the exemplary steering mechanism employs a circulating ball-type screw and nut connection for that purpose. As shown in Fig. 1, the enlarged lower end portion 36 of the steering shaft is formed with a helical groove 37 constituting a raceway for a series of steel balls 38. An elongated nut 39 encircling the shaft is correspondingly internally grooved for cooperation with the balls which are thus effective to impart axial movements to the nut upon rotation of the steering shaft. A tubular guide 40 provided on the nut directs the series of balls from one end of the groove to the other, or circulates them, as the nut is shifted along the screw. Axial movements of the nut are transmitted to the take-off shafts by means of rack teeth 41 provided on the nut and coacting with gear teeth 42 formed on one of the take-off shafts, in this instance the shaft 22.

In accordance with the invention, the take-off shafts 21 and 22, the steering shaft 30 and the steering arms 25 and 26 are combined and interrelated in a novel manner to maintain uniform, accurate alinement of the wheels W at different tread width adjustments and to automatically co-ordinate wheel movement on turns in either direction. To this end and as shown in Fig. 1, the steering shaft 30 has its grooved or threaded portion 36 disposed above and somewhat forwardly of the radius rod pivots 19 and the take-off shafts 21 and 22 are located ahead of the steering shaft. Furthermore, the take-off shafts are arranged with their axes offset both vertically and horizontally with respect to each other. In the exemplary mechanism, take-off shaft 22, which is drivingly coupled to the nut 39, is arranged in a lower plane than the companion take-off shaft 21 and the latter shaft is also located forwardly of the lower shaft.

The steering arm 25 is preferably slightly longer than the companion steering arm 26, the arm lengths being co-ordinated with the effective driving ratio provided by the gears 23 and 24 so that the ends of the arms swing through substantially equal arcs. The positioning of the take-off shafts, as above described, in conjunction with the dimensioning of the arms, permits the latter to be inclined rearwardly and downwardly, as shown in Fig. 1, so that their pivot connections 28 with the drag links may be vertically alined with the pivot connections 19 of the radius rods when the steering mechanism is in the straight ahead position.

As explained heretofore, when the tread width of the tractor front wheels is adjusted, that is upon endwise shifting of the front axle sections 13, each radius rod pivots about a vertical axis 45 constituting the axis of the universal joint 19. The construction above described permits the pivot connections 28 of the steering arms to be alined precisely upon the vertical axis 45 of the joint 19. Consequently, both the radius rods 18 and the drag links 27 swing about common vertical axes upon adjustment of the wheel tread width and the relationship between the steering arms and the wheels W therefore remains exactly the same in all adjusted positions of the wheels. In other words, the toe-in of the wheels is maintained precisely the same for all wheel adjustments within the limits imposed by manufacturing tolerances.

The novel organization of the elements of the steering mechanism also serves to swing the wheels W about a common center and imparts the correct angular movement to the wheels for turns in either direction from a straight ahead position. As shown diagrammatically in Fig. 4, of the drawings, with the steering mechanism in the straight ahead position, steering arms 25 and 26 are inclined rearwardly and downwardly and their connections with the drag links are located at the points respectively designated $x$ and $x'$. When a right turn is to be made, take-off shaft 21 is rocked clockwise and shaft 22 is rocked counter-clockwise. In this movement the drag link connection of the steering arm 25 swings forwardly through an arc $a$ from the point $x$ toward a point $y$ while the corresponding connection of the steering arm 26 swings rearwardly through an arc $b'$ from the point $x'$ towards a point $z'$. Thus, the portions of the swinging arc utilized for actuating the respective steering wheels W are disposed so that the chord of the arc $a$ is substantially parallel to the longitudinal axis of the drag link through which the steering arm 25 acts. The chord of the arc $b'$, on the other hand, is inclined at an angle to the axis of the associated drag link. Accordingly, the forward component of movement $c$ imparted to the right hand drag link 27 is substantially greater than the rearward component of movement $d$ imparted to the left-hand drag link 27, and the right-hand or inside wheel W will turn more sharply than the left-hand or outer side wheel.

In turns of the opposite direction or to the left, the steering arm 26 is swung forwardly from point $x'$ to point $y'$ to impart a forward component of movement $c$ to the left wheel W which is now the inside wheel. Steering arm 25 swings from point $x$ to point $z$ and imparts to the right wheel W a rearward component or movement $d$ smaller than the component $c$. Thus, in this instance, also, the inside or left front wheel is swung more sharply than the outside wheel. It will be understood, of course, that while the diagram illustrates the maximum movements of the steering arms, proportionate movements will be imparted to the wheels for shorter swings of the steering arms.

It will be apparent from the foregoing that the invention provides steering mechanism of novel and improved construction particularly well adapted for agricultural tractors. The mechanism is simple and sturdy, and well adapted for mass production. Through the novel relationship of the elements of the mechanism, tread width adjustments of the tractor steering may be made without adversely affecting the alinement or toe-in of the steering wheels in any adjusted position. Moreover, this novel organization of the elements automatically compensates for turns in either direction by turning the inside wheel more sharply than the outside wheel thus avoiding the need for complicated and expensive linkages.

I claim as my invention:

1. In a tractor having dirigible wheels adjustable for different tread widths and stabilized by a pair of radius rods respectively pivoted to opposite sides of the tractor body and swingable about said pivots in the adjustment of the wheels, steering mechanism including a gear box mounted on the tractor body, a generally vertically disposed steering shaft journaled at its lower end in said gear box, a pair of take-off shafts journaled on said gear box and respectively projecting at opposite sides of the box, steering arms fixed on the projecting ends of said shafts, drag links of equal length connecting the arms with the respective wheels, and driving connections between said steering shaft and one of said take-off shafts and between the two take-off shafts whereby the latter may be rocked simultaneously in opposite directions to swing said steering arms through substantially equal arcs, said take-off shafts being located ahead of the radius rod pivots and one of said take-off shafts being disposed below and rearwardly of the other take-off shaft, and said arms extending rearwardly and downwardly from said shafts and at the same angle when in the straight-ahead steering position, the arm fixed on the upper shaft being sufficiently longer than the other arm to locate their connections with the drag links in vertical alinement with each other and with the radius rod pivots in such straight ahead steering position of the wheels so as to maintain the relationship between the steering mechanism and the wheels constant in all adjusted positions of the wheels for different tread widths.

2. In a tractor having dirigible wheels adjustable laterally for different tread widths and stabilized by a pair of radius rods pivotally secured to opposite sides of the tractor body, a steering gear box supporting a pair of take-off shafts respectively fitted with steering arms disposed at opposite sides of the gear box, drag links pivotally connected to the ends of said arms and extending to the respective wheels, one of said shafts being located above and forwardly of the radius rod pivots and the other of said shafts being located above and forwardly of said one shaft, said steering arms being directed rearwardly and downwardly at an angle to the vertical, the arm fitted to the upper shaft being longer than the other arm so as to locate their connections with the drag links in vertical alinement with each other and with the radius rod pivots when the wheels are in straight ahead position, and gearing connecting said take-off shafts for simultaneous rotation in opposite directions, said gearing having a ratio such that the outer ends of said arms are swung through substantially equal arcs as the shafts rotate in a steering action.

References Cited in the file of this patent

UNITED STATES PATENTS

| | | |
|---|---|---|
| 1,305,298 | Marceau | June 3, 1919 |
| 2,247,725 | Ferguson | July 1, 1941 |
| 2,507,000 | Farmer | May 9, 1950 |